(No Model.)

C. A. HORTON.
ANTI RATTLER FOR THILL COUPLINGS.

No. 318,477. Patented May 26, 1885.

WITNESSES
Charles H. Titus
E. F. Woover

INVENTOR
Charles A. Horton
By Walter B. Vincent Atty.

UNITED STATES PATENT OFFICE.

CHARLES A. HORTON, OF PAWTUCKET, RHODE ISLAND.

ANTI-RATTLER FOR THILL-COUPLINGS.

SPECIFICATION forming part of Letters Patent No. 318,477, dated May 26, 1885.

Application filed February 2, 1885. (No model.)

*To all whom it may concern:*

Be it known that I, CHARLES A. HORTON, of Pawtucket, in the State of Rhode Island, have made certain new and useful Improvements in Anti-Rattlers for Carriage-Shackles; and I do hereby declare that the following specification, taken in connection with the drawings making a part of the same, is a full, clear, and exact description thereof.

Figure 2:
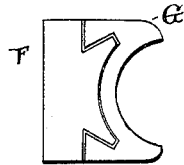
Figure 3:
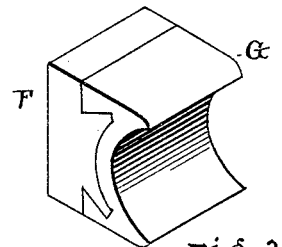
Figure 1:
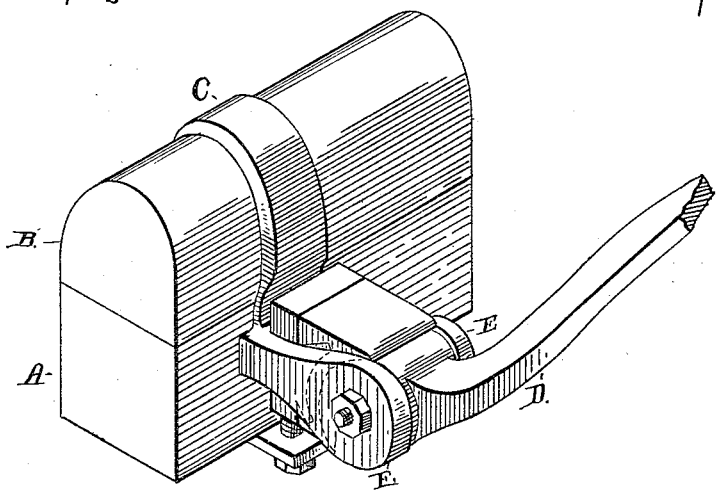
Figure 4:
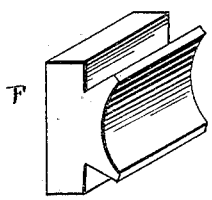
Figure 5:
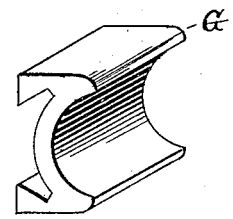

Figure 1 is a perspective view of my device and contiguous parts. Figs. 2 and 3 are respectively end and perspective views of my improved anti-rattler. Figs. 4 and 5 show the two parts of the same.

The object of my invention is to produce an anti-rattler for carriage-shackles which shall be more durable and effective than those now in use; and it consists in the combination and arrangement of rubber and metal, as hereinafter described.

In the drawings, A, Fig. 1, is the axle; B, the axle-cap; C, the axle-clip; D, the shackle, which is secured by a pintle to and within ears E E, projecting horizontally from the shackle D.

To prevent the rattling of the shackle D a piece of rubber has heretofore been placed within the ears E E and between the shackle D and the axle-clip C, such piece of rubber being somewhat thicker than the space described, and requiring to be somewhat compressed by the introduction and adjustment of the shackle. This piece of rubber, while fairly effective in the first instance, soon wears away by reason of its soft character, and allows the parts to become loose.

In my invention I form the anti-rattler in two parts, F G, as shown in Figs. 2, 3, 4, and 5, which are dovetailed together in such a manner that they may be easily detached one from the other by sliding laterally. The part F, I make of rubber, and the part G of brass or other suitable metal, the latter having a curved or convex surface to receive the shackle and also retain the anti-rattler itself in place.

An anti-rattler composed of rubber and metal united by a dovetail joint in the manner described embraces both the elastic properties of the solid rubber heretofore in use, and at the same time presents a surface to the shackle which will resist its constant wear. In my device the rubber itself is not subjected to any wear, and if it should at any time be damaged or become hard and unyielding a new piece could be substituted and the metal part G retained for further service.

I am aware that thill-couplings have been formed with a metal portion and a rubber portion, the metal portion having rearwardly-extending box or walls in which the rubber portion is held, and that they have also been formed with a rubber portion having a transverse aperture, into which an extension of the metal wear-plate projects to hold the parts; and I do not claim such, as the former does not possess the advantage of the dovetail connection, and the latter utilizes only a very narrow portion of the rubber in giving elastic action to the plate back of the extension on the plate, while in my invention, by having the mortise of the dovetail in the metal piece and the flaring tenon on the rubber piece, the entire thickness of rubber is utilized, and at the same time a solid front of metal is presented for wear, whereas in the construction in which the extension for entering the transverse slot in the rubber is formed by crimping or bending the metal plate a joint and edges are presented for wear.

What I claim as my invention, and desire to secure by Letters Patent, is—

An anti-rattler for carriage-shackles, composed of two parts, F and G, the former, F, being a solid rubber block with the flaring tenon of a dovetail on its front face, and the latter, G, being formed of brass or analogous material, having a solid unbroken front face and a dovetail mortise on the rear thereof, to receive the tenon on the rubber piece, as set forth.

CHARLES A. HORTON.

Witnesses:
WALTER B. VINCENT,
CHARLES H. TITUS.